(12) United States Patent
Kawajiri

(10) Patent No.: US 8,576,426 B2
(45) Date of Patent: Nov. 5, 2013

(54) IMAGE PROCESSING APPARATUS, METHOD OF CONTROLLING THE SAME, AND STORAGE MEDIUM TO OUTPUT AN IMAGE SELECTED FROM IMAGES CONTAINED IN A FILE

(75) Inventor: Kensuke Kawajiri, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 848 days.

(21) Appl. No.: 12/682,564

(22) PCT Filed: Aug. 6, 2009

(86) PCT No.: PCT/JP2009/003789
§ 371 (c)(1),
(2), (4) Date: Apr. 9, 2010

(87) PCT Pub. No.: WO2010/021098
PCT Pub. Date: Feb. 25, 2010

(65) Prior Publication Data
US 2010/0271659 A1    Oct. 28, 2010

(30) Foreign Application Priority Data
Aug. 21, 2008  (JP) .................................. 2008-212937

(51) Int. Cl.
*G06F 3/12* (2006.01)
(52) U.S. Cl.
USPC ............. 358/1.15; 358/1.2; 358/1.6; 358/1.9; 358/1.13; 358/540

(58) Field of Classification Search
None
See application file for complete search history.

(56) References Cited

U.S. PATENT DOCUMENTS

| | | | |
|---|---|---|---|
| 2004/0165780 A1* | 8/2004 | Maki et al. ..................... | 382/232 |
| 2004/0189687 A1* | 9/2004 | Yamamoto ..................... | 345/716 |
| 2006/0204144 A1* | 9/2006 | Fujiwara et al. ................ | 382/305 |
| 2007/0077025 A1* | 4/2007 | Mino .............................. | 386/95 |
| 2009/0172011 A1* | 7/2009 | Onomura ....................... | 707/102 |
| 2011/0176174 A1* | 7/2011 | Terao ............................ | 358/1.15 |

FOREIGN PATENT DOCUMENTS

| | | |
|---|---|---|
| JP | 2000-029643 A | 1/2000 |
| JP | 2002-149153 A | 5/2002 |
| JP | 2004-295231 A | 10/2004 |
| JP | 2006-253994 A | 9/2006 |
| JP | 2006-301515 A | 11/2006 |
| JP | 2007-043698 A | 2/2007 |

* cited by examiner

*Primary Examiner* — Miya J Cato
(74) *Attorney, Agent, or Firm* — Canon USA, Inc., IP Division

(57) ABSTRACT

In accordance with the acceptance of an output instruction to output a single file containing a plurality of images from a user, at least one of the images contained in the file specified to be output based on the output instruction is output. At that time, control is performed so that at least one image is selected from among images associated with each other of the images contained in the file specified to be output based on the output instruction and the selected image is output.

18 Claims, 13 Drawing Sheets

| | ITEM | VALUE |
|---|---|---|
| 901 | OUTPUT SETTING OF MULTIPLE-IMAGE FORMAT FILE | ON OR OFF |
| 902 | OUTPUT FILE IN MULTIPLE-IMAGE FORMAT | ON OR OFF |
| 903 | DELETE COLOR IMAGE | ON OR OFF |
| 904 | DELETE LOW-RESOLUTION IMAGE | ON OR OFF |
| 905 | THRESHOLD RESOLUTION | 300 dpi |
| 906 | OUTPUT ONLY REPRESENTATIVE IMAGE | ON OR OFF |
| 907 | OUTPUT ALL OF IMAGES AS INDIVIDUAL FILES | ON OR OFF |

Fig. 10

```
SELECT FILE
```
| FILE NAME | STORAGE DATE AND TIME |
|---|---|
| ABC | 01/01/2008 08:30 |
| DEF | 01/01/2008 12:35 |
| GHI | 01/02/2008 17:30 |
| JKL | 01/03/2008 08:30 |

1001 △
1002 1/5
▽
1003
1004 SPECIFY DESTINATION
1005 TRANSMIT

Fig. 11

SPECIFY TRANSMISSION DESTINATION

12345@abc.co.jp

\\hostA\folder1

1101

1102 ENTER

[Fig. 18]
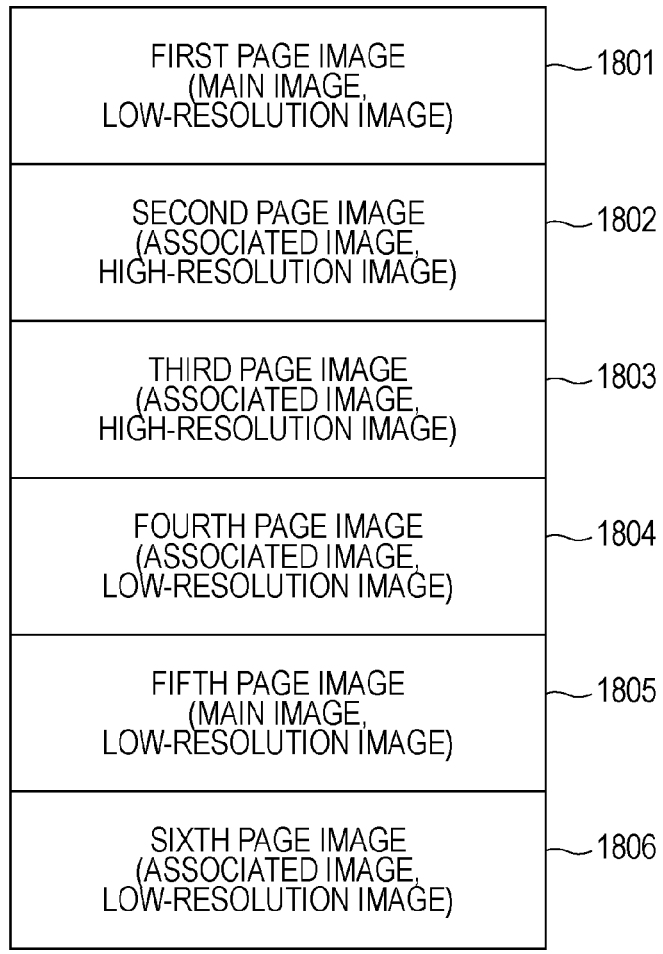
[Fig. 19]
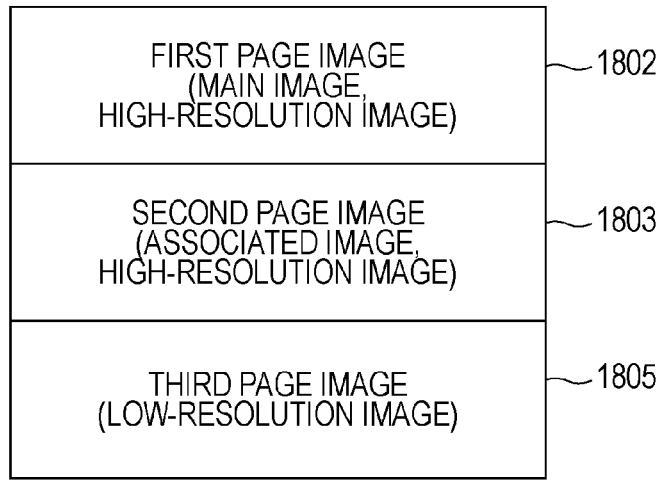

IMAGE PROCESSING APPARATUS, METHOD OF CONTROLLING THE SAME, AND STORAGE MEDIUM TO OUTPUT AN IMAGE SELECTED FROM IMAGES CONTAINED IN A FILE

CROSS REFERENCE TO RELATED APPLICATIONS

This application is a National Stage filing of PCT application No. PCT/JP2009/003789 filed on Aug. 6, 2009 which claims priority from Japanese Patent Application No. 2008-212937 filed Aug. 21, 2008, all of which is hereby incorporated by reference herein in their entirety.

Technical Field

The present invention relates to an image processing apparatus for, when accepting an instruction to output a single file containing a plurality of images, outputting an image selected from among the images contained in the single file, a method for controlling the image processing apparatus, and a storage medium.

Background Art

There have been known multifunction peripherals (MFPs) for, when a user selects any image from among input images, outputting the selected image.

Such an MFP obtains input images in a variety of methods, for example, by receiving image data from a host computer connected to the MFP, reading a document through a scanner included in the MFP to acquire image data, and reading out image data stored in a mobile memory medium.

The input images are stored into a hard disk included in the MFP. A list of images stored in the hard disk is displayed on a display unit in accordance with an instruction from the user. The user is permitted to select any image on the basis of the displayed list.

When the user selects any image, the selected image is output in any way, for example, by transmitting image data corresponding to the selected image to an external device via a network, or writing the image data into a mobile memory medium.

Furthermore, there has been recently known a format in which a single file contains a plurality of images. For example, Japanese Patent Laid-Open No. 2002-149153 discloses a technique of holding images with different resolutions in a single file and selecting an image to be displayed in accordance with a display area of a display apparatus for displaying images.

When a file in such a format that a plurality of images can be contained in a single file is output, the following problem may occur.

Assuming that the file contains a plurality of images, when the user instructs the MFP to output the file, all of images contained in the file specified to be output are output. However, all the images contained in the file are not necessarily needed. In many cases, some of the images are not required.

For example, when a file containing a plurality of images having the same contents but having different resolutions is output, it is unnecessary to output all of the images. In some cases, one or more images with resolutions higher than a predetermined resolution may be output. More specifically, if a terminal, serving as a file output destination, can support high-resolution images, it is unnecessary to output a low-resolution image.

In addition, when a file containing a color image and a monochrome image which have the same contents is output, either the color image or the monochrome image may be output in some cases. More specifically, if a terminal, serving as a file output destination, does not support color images and processes only monochrome images, it is useless to output the color image which is not needed for the output destination.

As described above, in the case where a file in the format in which a single file contains a plurality of images is output, if all of images contained in the file specified to be output are output, unnecessary images are output, thus increasing an additional load.

The present invention has been made in consideration of the above-described problem. The present invention provides a mechanism for, when an instruction to output a single file containing a plurality of images is given, selecting at least one image from among images associated with each other of the contained images and outputting the selected image.

Citation List

Patent Literature

PTL 1: Japanese Patent Laid-Open No. 2002-149153

SUMMARY OF INVENTION

The present invention provides an image processing apparatus, a method of controlling the image processing apparatus, and a computer-readable storage medium storing a program for the method, the apparatus and method overcoming the above-described problem.

According to an aspect of the present invention, an image processing apparatus includes an accepting unit configured to accept an output instruction to output a single file containing a plurality of images from a user, an outputting unit configured to output at least one of the images contained in the file specified to be output based on the output instruction, a selecting unit configured to specify images which are associated with each other from among the plurality of images contained in the file specified to be output, and to select at least one image from among the specified images, and a controlling unit configured to cause the outputting unit to output the image, selected by the selecting unit, in accordance with the acceptance of the output instruction by the accepting unit.

According to another aspect of the present invention, there is provided a method of controlling an image processing apparatus. The method includes an accepting step of accepting an output instruction to output a single file containing a plurality of images from a user, an outputting step of outputting at least one of the images contained in the file specified to be output based on the output instruction, a specifying step of specifying images which are associated with each other from among the plurality of images contained in the file specified to be output, a selecting step of selecting at least one image from among the specified images, and a controlling step of causing the image, selected in the selecting step, to be output in the outputting step in accordance with the acceptance of the output instruction in the accepting step.

According to another aspect of the present invention, there is provided a computer-readable storage medium that stores a program for allowing a computer to execute the above-described method.

Further features of the present invention will become apparent from the following description of exemplary embodiments with reference to the attached drawings.

BRIEF DESCRIPTION OF DRAWINGS

The accompanying drawings, which are incorporated in and constitute a part of the specification, illustrate embodiments of the invention and, together with the description, serve to explain the principle of the invention.

FIG. 10 is a diagram illustrating a file list window in the embodiment of the present invention.

FIG. 11 illustrates a destination specification window in the embodiment of the present invention.

FIG. 18 is a diagram illustrating a file in the multiple-image format in the embodiment of the present invention.

FIG. 19 is a diagram illustrating a file in the multiple-image format in the embodiment of the present invention.

DESCRIPTION OF EMBODIMENTS

Exemplary embodiments of the present invention will be described in detail below with reference to the drawings. The following embodiments are not intended to restrict the present invention described in the appended claims. All of the combinations of features described in the embodiments are not necessary for solving problems in accordance with an embodiment of the present invention.

First Embodiment

A first embodiment of the present invention will be described below. This embodiment relates to a case where, when an instruction to output a single file containing a plurality of images is given, at least one image is selected from among images associated with each other of the contained images in accordance with a previously set condition and is then output.

Figure 1:
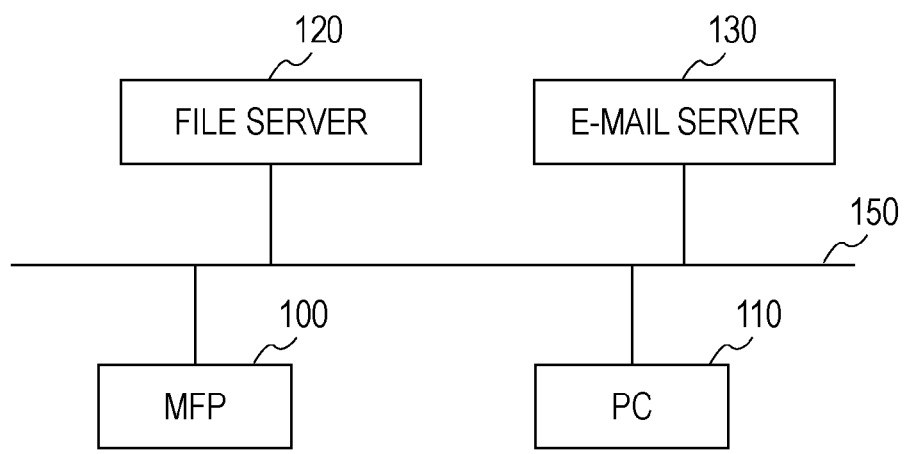
FIG. 1 is a diagram illustrating an overall network in accordance with an embodiment of the present invention.

FIG. 1 is a diagram illustrating an overall network in the first embodiment. An MFP 100 and a personal computer (PC) 110 are provided on a local area network (LAN) 150. The MFP 100 includes a scanner and a printer which will be described below. The MFP 100 communicates with the PC 110 via the LAN 150 so that the MFP 100 and the LAN 150 transmit and receive images to/from each other.

Furthermore, a file server 120 is provided on the LAN 150. The file server 120 stores an image transmitted from the MFP 100 and transmits an image stored in the file server 120 to the MFP 100 in response to a request from the MFP 100. In addition, the MFP 100 performs e-mail communication with the PC 110 and another external device via an e-mail server 130.

Figure 2:
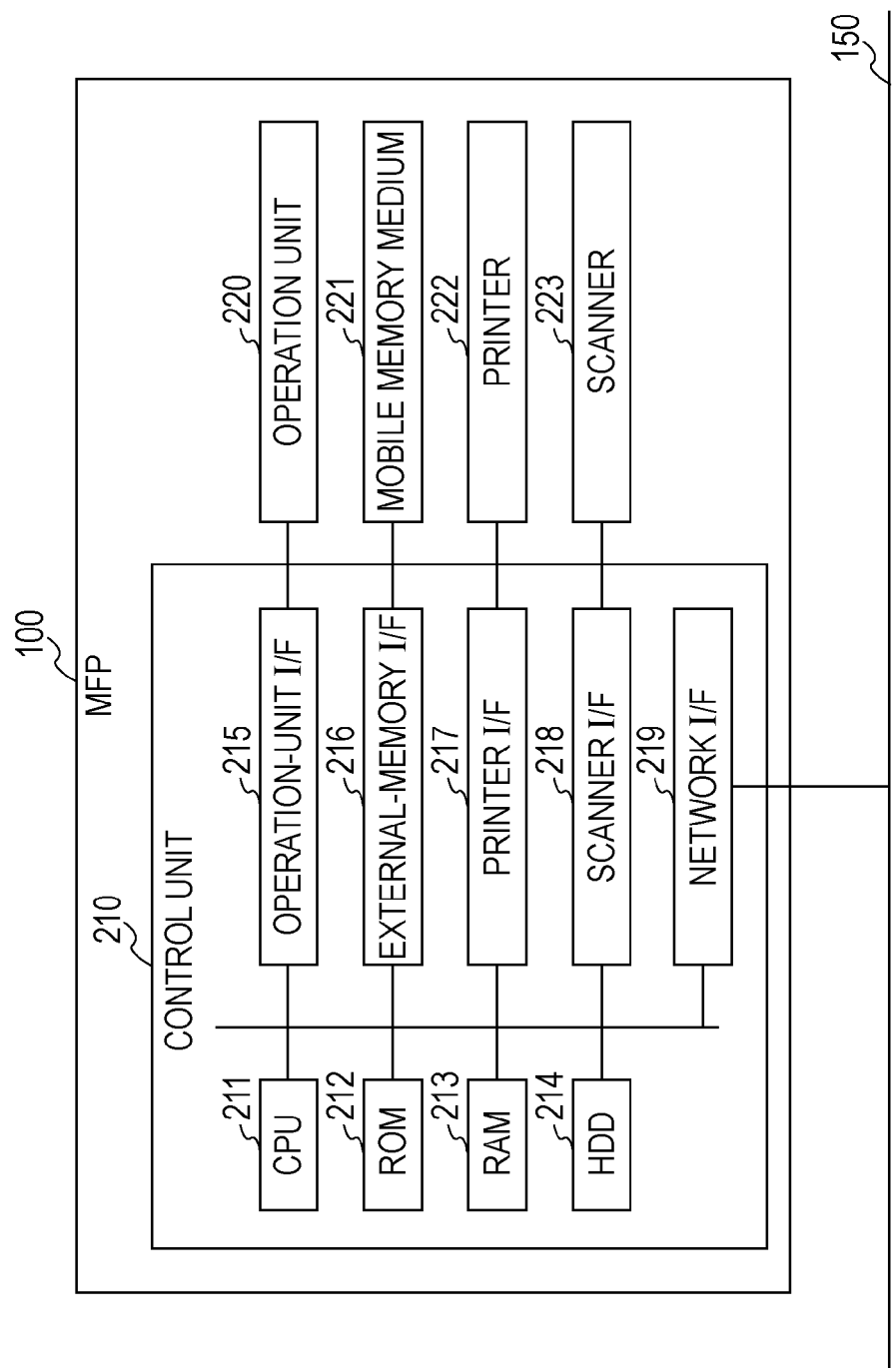
FIG. 2 is a block diagram illustrating the configuration of an MFP in the embodiment of the present invention.

FIG. 2 is a block diagram illustrating the configuration of the MFP 100. A control unit 210, including a central processing unit (CPU) 211, controls an operation of the entire MFP 100. The CPU 211 reads out a control program stored in a read-only memory (ROM) 212 to implement various control processes. A random access memory (RAM) 213 serves as a main memory for the CPU 211 and a temporarily storage area, such as a working area.

A hard disk drive (HDD) 214 stores an image input to the MFP 100. An image stored in the HDD 214 is displayed on a liquid-crystal display provided for an operation unit 220 and is also output to the printer, indicated at 222, an external device on the LAN 150, or a mobile memory medium 221 in accordance with a user operation.

An operation-unit interface (I/F) 215 connects the operation unit 220 to the control unit 210. The operation unit 220 is provided with the liquid-crystal display having a touch panel function, and a keyboard.

An external-memory interface (I/F) 216 connects the mobile memory medium 221 to the control unit 210. The mobile memory medium 221 communicates with the control unit 210 using any of various wired and wireless communication methods, e.g., universal serial bus (USB) to transmit and receive data of, for example, an image.

A printer interface (I/F) 217 connects the printer 222 to the control unit 210. An image to be printed using the printer 222 is transferred from the control unit 210 through the printer I/F 217 to the printer 222 and is stored into a recording medium in the printer 222.

A scanner interface (I/F) 218 connects the scanner, indicated at 223, to the control unit 210. The scanner 223 reads an image on a document to generate image data and supplies the data to the control unit 210 through the scanner I/F 218. The scanner 223 is capable of generating a file in a format (multiple-image format) in which a single file contains a plurality of images and which will be described below.

A network interface (I/F) 219 connects the control unit 210 (MFP 100) to the LAN 150. The network OF 219 transmits an image to an external device on the LAN 150 and receives an image from the external device on the LAN 150.

The multiple-image format will now be described.

Figure 3:
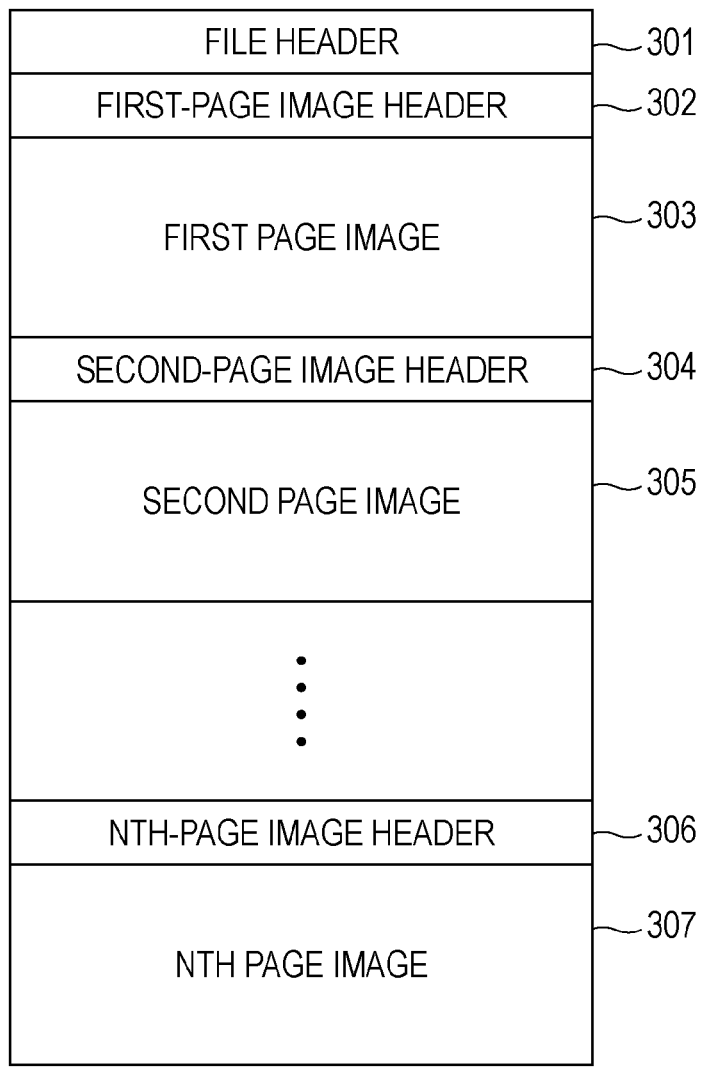
FIG. 3 is a diagram illustrating the structure of a file in a multiple-image format in the embodiment of the present invention.

FIG. 3 illustrates the structure of a file (hereinafter, also referred to as a "multiple-image format file") in the multiple-image format. A file header 301 stores information indicating the address of a first-page image header 302, the overall size of the file, and that the file is in the multiple-image format.

The first-page image header 302 stores information relating to a first page image 303. A second-page image header 304 stores information relating to a second page image 305. An Nth-page image header 306 stores information relating to an Nth page image 307.

In this case, it is assumed that the respective images contained in the file in the multiple-image format are general format images, e.g., JPEG images. If a file in the multiple-image format is input to an MFP or PC that does not support the multiple-image format, therefore, a first page image alone can be displayed by generalized JPEG viewer software.

Figure 4:
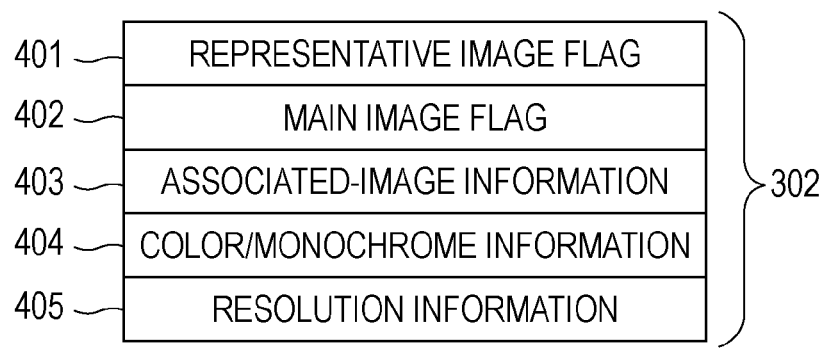
FIG. 4 is a diagram illustrating the structure of an image header in the embodiment of the present invention.

FIG. 4 illustrates the structure of the first-page image header 302 shown in FIG. 3. A representative image flag 401 is on when the image 303 is a representative image. A "representative image" is an image previously specified as an example representing a file. Only one of images contained in a single file is specified as a representative image.

A main image flag 402 is on when the image 303 is a main image. A "main image" is an image previously specified as an example representing images associated with each other of images contained in a file in the multiple-image format. Only one of images associated with each other is specified as a main image.

In this embodiment, a plurality of images associated with each other are a color image and a monochrome image having the same contents. In addition, a plurality of images having the same contents and different resolutions are also handled as images associated with each other. A plurality of images having the same contents and different conditions other than the above-described different visuals, such as color and monochrome or different resolutions, may be handled as images associated with each other.

Associated-image information 403 includes information indicating an image, associated with the image 303, of the images contained in the file when the main image flag 402 is on. For example, when the image 303 is a color image, information indicating a monochrome image having the same contents as those of the image 303 is stored as the associated-image information 403. Alternatively, information indicating an image having the same contents as those of the image 303 and having a different resolution from that of the image 303 is stored as the associated-image information 403.

Color/monochrome information 404 includes information indicating whether the image 303 is a color image or a monochrome image. Resolution information 405 includes information indicating a resolution of the image 303.

Figure 5:
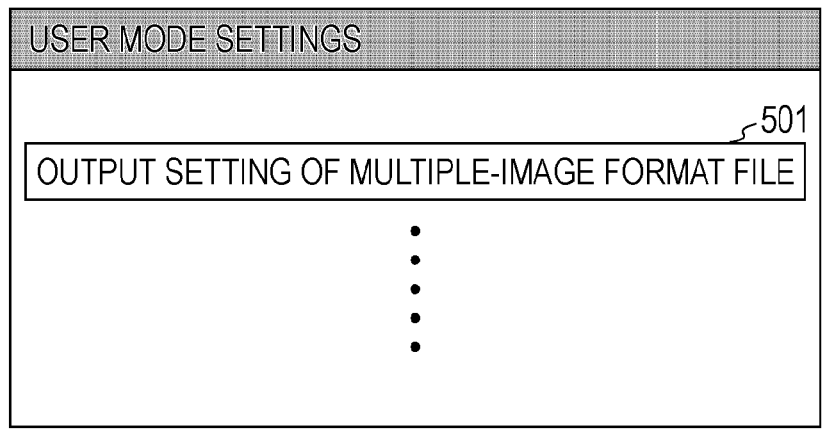
FIG. 5 is a diagram illustrating a window for user mode settings in the embodiment of the present invention.

FIG. 5 illustrates a window for performing various settings as user mode settings on the MFP 100. The window shown in FIG. 5 displays a plurality of buttons including a button 501. A user selects any of the buttons in accordance with what the user wants to set and presses the selected button.

The button 501 is pressed when the user performs setting (first specification) relating to output of a multiple-image format file. When the button 501 is pressed, a window shown in FIG. 6 is displayed.

Figure 6:
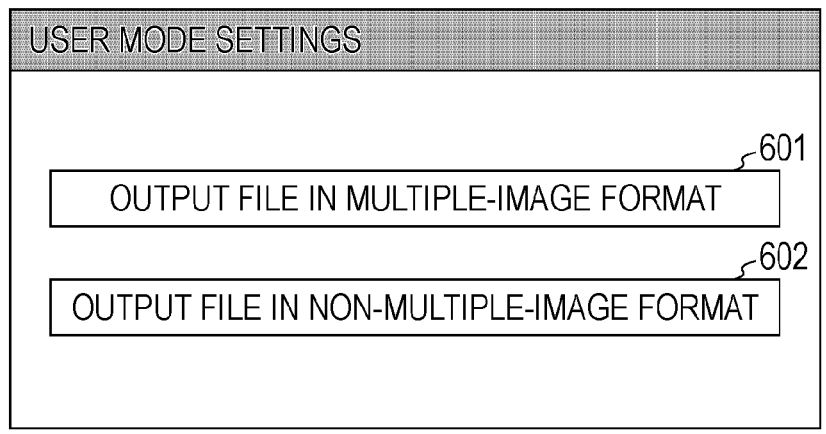
FIG. 6 is a diagram illustrating another window for user mode settings in the embodiment of the present invention.

FIG. 6 illustrates the window for performing setting (second specification) relating to output of a multiple-image format file. Referring to FIG. 6, the window displays a button 601 and a button 602. In the case where the user gives an instruction to output a file in the multiple-image format, when the user wants to output an image contained in the file as a file in the multiple-image format, the user presses the button 601. In the case where the user gives an instruction to output a file in the multiple-image format, when the user wants to output an image contained in the file as a file in a normal format other than the multiple-image format, the user presses the button 602.

Figure 7:
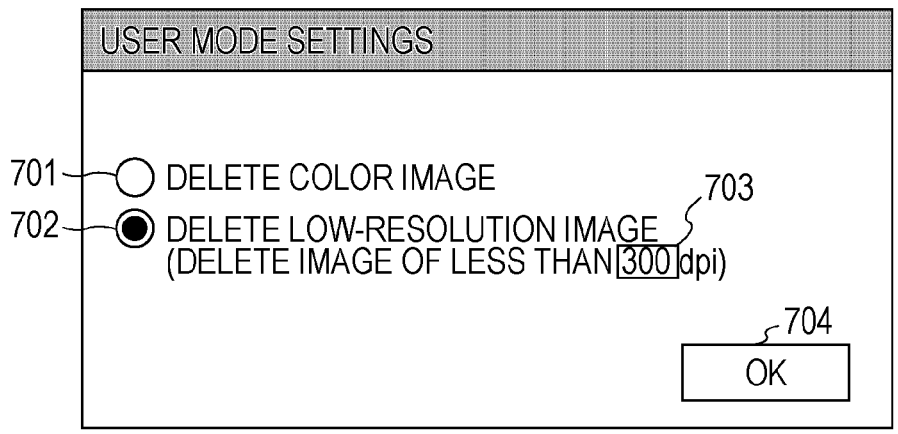
FIG. 7 is a diagram illustrating another window for user mode settings in the embodiment of the present invention.

FIG. 7 illustrates a window displayed when the button 601 shown in FIG. 6 is pressed. Referring to FIG. 7, the window displays a radio button 701 and a radio button 702 to prompt the user to select either of a first condition "DELETE COLOR IMAGE" and a second condition "DELETE LOW-RESOLUTION IMAGE" in the present embodiment.

In the case where the user gives an instruction to output a file in the multiple-image format, when the user intends to select a monochrome image from among the images contained in the file (hereinafter, also referred to as "target file") specified to be output and output the selected image, the user selects "DELETE COLOR IMAGE", serving as the first condition. Alternatively, in this case, when the user intends to select a high-resolution image from among the images contained in the target file and output the selected image, the user selects "DELETE LOW-RESOLUTION IMAGE", serving as the second condition.

In the case where the user selects "DELETE LOW-RESOLUTION IMAGE", the user can input a threshold resolution into an input field 703. The threshold resolution is used to distinguish a high-resolution image from a low-resolution image. Referring to FIG. 7, a condition "DELETE IMAGE OF LESS THAN 300 dpi" is set. Accordingly, setting is performed so that an image with a resolution of less than 300 dpi of the images contained in the target file is not output and an image with a resolution of 300 dpi or higher is output.

When an OK button 704 is pressed after either the first condition "DELETE COLOR IMAGE" or the second condition "DELETE LOW-RESOLUTION IMAGE" is selected, information indicating descriptions of such an input operation is stored into the HDD 214 and the window of FIG. 7 then closes.

Figures 8, 9:
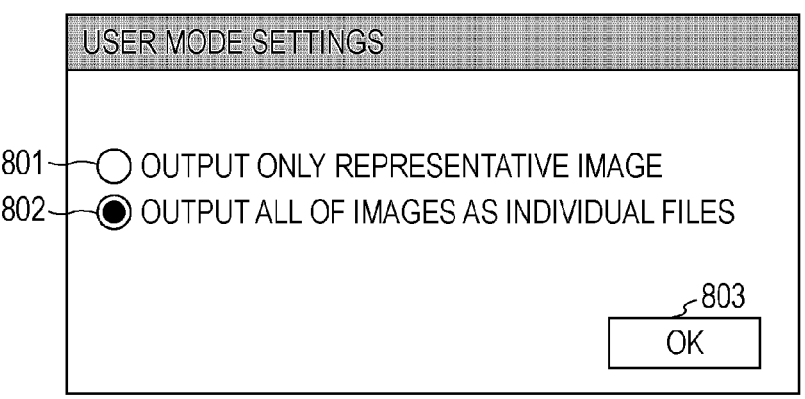
FIG. 8 is a diagram illustrating another window for user mode settings in the embodiment of the present invention.
FIG. 9 is a diagram illustrating a management table for managing descriptions of settings made in the windows shown in FIGS. 5 to 8 in the embodiment of the present invention.

FIG. 8 illustrates a window displayed when the button 602 shown in FIG. 6 is pressed. This window is for performing setting (third specification) for output of a file in the normal format different from the multiple-image format. Referring to FIG. 8, the window displays a radio button 801 and a radio button 802 to prompt the user to select either one of a condition "OUTPUT ONLY REPRESENTATIVE IMAGE" and a condition "OUTPUT ALL OF IMAGES AS INDIVIDUAL FILES".

In the case where the user gives an instruction to output a file in the multiple-image format, when the user intends to output only the representative image of the images contained in the target file, the user selects the condition "OUTPUT ONLY REPRESENTATIVE IMAGE". Alternatively, in this case, when the user intends to output the images contained in the target file as individual files, the user selects the condition "OUTPUT ALL OF IMAGES AS INDIVIDUAL FILES".

After either the condition "OUTPUT ONLY REPRESENTATIVE IMAGE" or the condition "OUTPUT ALL OF IMAGES AS INDIVIDUAL FILES" is selected, when an OK button 803 is pressed, information indicating descriptions of such an input operation is stored into the HDD 214 and the window of FIG. 8 then closes.

FIG. 9 illustrates a management table for managing pieces of information (hereinafter, "information blocks") indicating descriptions of setting operations performed on the windows shown in FIGS. 5 to 8. The management table is stored in the HDD 214.

An item 901 includes information indicating whether setting for output of a file in the multiple-image format has been made. In the case where the button 501 in FIG. 5 has been pressed and settings for output of the file in the multiple-image format have been performed on the following windows, a value in the item 901 indicates "on". If such settings have not been performed, a value in the item 901 indicates "off".

An item 902 is assigned a value only when the value in the item 901 indicates "on". When an instruction to output a file in the multiple-image format is given, the item 902 includes information indicating whether or not to output an image as a file in the multiple-image format. Specifically, when the button 601 in FIG. 6 is pressed, a value in the item 902 indicates "on". When the button 602 is pressed, the value in the item 902 indicates "off".

Items 903 and 904 are assigned values only when the value in the item 902 indicates "on". A value in either one of the items 903 and 904 indicates "on" and a value in the other one indicates "off". When the instruction to output a file in the multiple-image format is given, the item 903 includes information indicating whether or not to select and output a monochrome image from images contained in the target file. Specifically, when the condition "DELETE COLOR IMAGE" is selected in the window of FIG. 7, a value in the item 903 indicates "on". When the condition "DELETE LOW-RESOLUTION IMAGE" is selected, the value in the item 903 indicates "off".

When the instruction to output a file in the multiple-image format is given, the item 904 includes information indicating whether or not to select and output a high-resolution image from images contained in the target file. Specifically, when the condition "DELETE LOW-RESOLUTION IMAGE" is selected in the window of FIG. 7, a value in the item 904 indicates "on". When the condition "DELETE COLOR IMAGE" is selected, the value in the item 904 indicates "off".

An item 905 is assigned a value only when the value in the item 904 indicates "on". The item 905 includes a resolution input in the input field 703 in the window of FIG. 7.

Items 906 and 907 are assigned values only when the value in the item 902 indicates "off". A value in either the item 906 or the item 907 indicates "on" and a value in the other one indicates "off". When the instruction to output a file in the multiple-image format is given, the item 906 includes information indicating whether or not to output only the representative image of images contained in the target file. Specifically, when the condition "OUTPUT ONLY REPRESENTATIVE IMAGE" is selected in the window of FIG. 8, the value in the item 906 indicates "on". When the condition "OUTPUT ALL OF IMAGES AS INDIVIDUAL FILES" is selected, the value in the item 906 indicates "off".

When the instruction to output a file in the multiple-image format is given, the item 907 includes information indicating whether or not to output all of images contained in the target file as individual files. Specifically, when the condition "OUTPUT ALL OF IMAGES AS INDIVIDUAL FILES" is selected in the window of FIG. 8, the value in the item 907 indicates "on". When the condition "OUTPUT ONLY REPRESENTATIVE IMAGE" is selected, the value in the item 907 indicates "off".

FIG. 10 illustrates a file list window displayed on the liquid-crystal display of the operation unit 220. The file list window displays information blocks relating to a plurality of files stored in the HDD 214 and the mobile memory medium 221. When the number of files to be displayed exceeds a predetermined number of files displayable within the window, a scroll key 1001 is displayed. In an area 1002, information indicating the total number of window pages and also indicating which window page is currently displayed is displayed. Referring to FIG. 10, it can be seen that the total number of window pages is five and the first window page is currently displayed.

In an area 1003, the information blocks relating to the respective files are displayed. Referring to FIG. 10, the information blocks indicating file names and the date and time of storage of the files are displayed. Since the liquid-crystal display has the touch panel function, the user can specify a desired file by touching a portion corresponding to the desired file on the basis of the information displayed in the area 1003. When any file is specified by the user, information relating to the file is highlighted and selected. Referring to FIG. 10, it can be seen that a file "DEF" is selected by the user.

A SPECIFY DESTINATION button 1004 is pressed when the user specifies a destination as an output destination to which an image contained in the selected file is to be output. In the following description, as a method of outputting an image contained in the selected file, transmission of the image to an external device via the LAN 150 will be described as an example. The image may be written into the mobile memory medium 221 connected to the MFP 100 and be output.

FIG. 11 illustrates a destination specification window displayed in the liquid-crystal display of the operation unit 220. To transmit the image using an e-mail, the user inputs an e-mail address in this destination specification window. To transmit the image using a file transmission protocol, e.g., Server Message Block (SMB), the user inputs information indicating a host name or a transmission destination directory. When the user intends to set the mobile memory medium 221 as an image output destination, the mobile memory medium 221 can be specified in the destination specification window.

Destination information input by the user is displayed in a field 1101. When the user presses an ENTER button 1102 after specifying a destination, the destination specification window closes and the file list window of FIG. 10 is again displayed. When the user presses a TRANSMIT button 1005 after selecting any of the files displayed in the file list window, an image contained in the selected file is transmitted to the specified destination.

Figure 12:
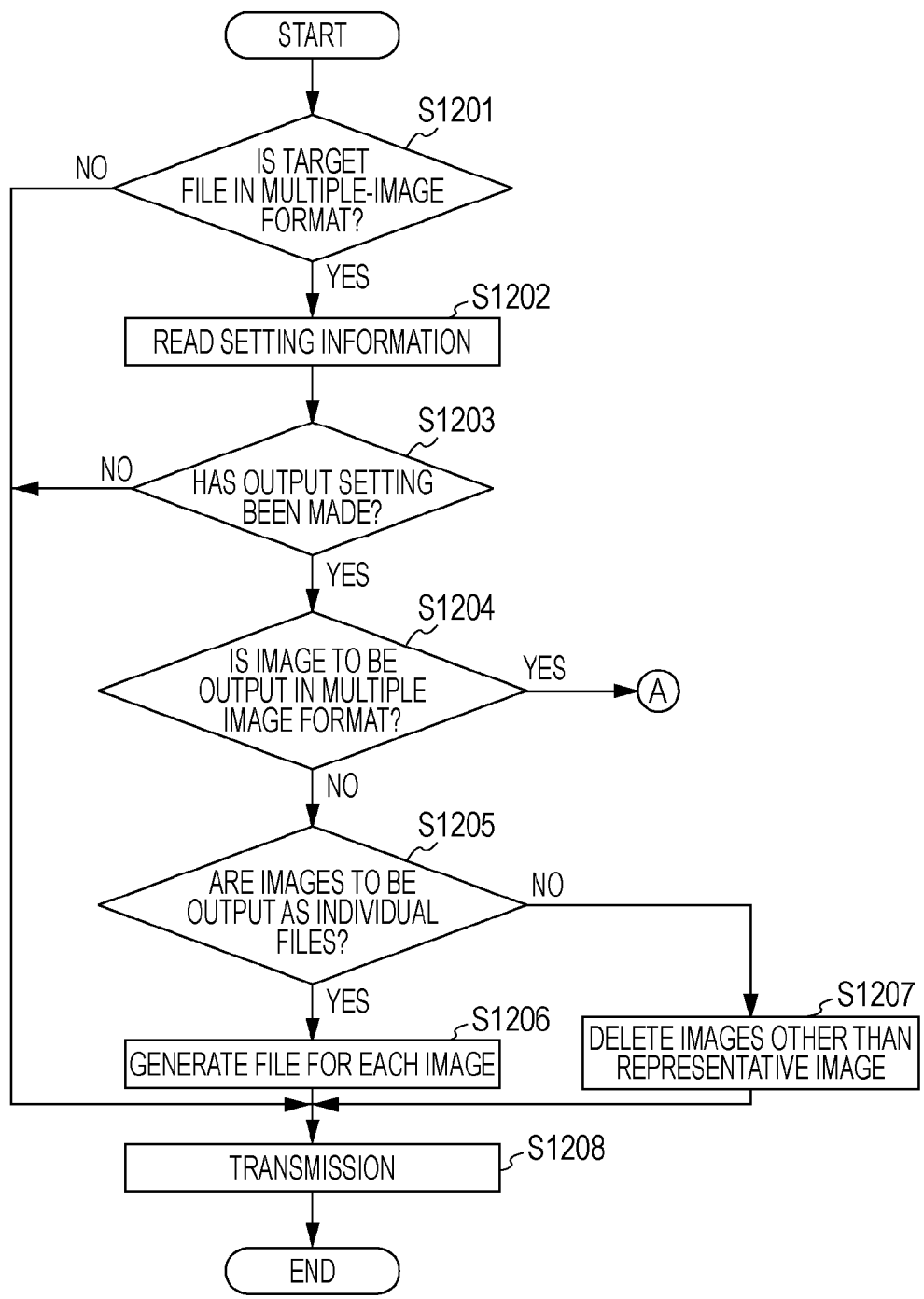
FIG. 12 is a flowchart explaining an operation of, when an instruction to transmit a file is given, selecting at least one image from among images associated with each other of images contained in a file specified to be transmitted and outputting the selected image in the embodiment of the present invention.
Figure 13:
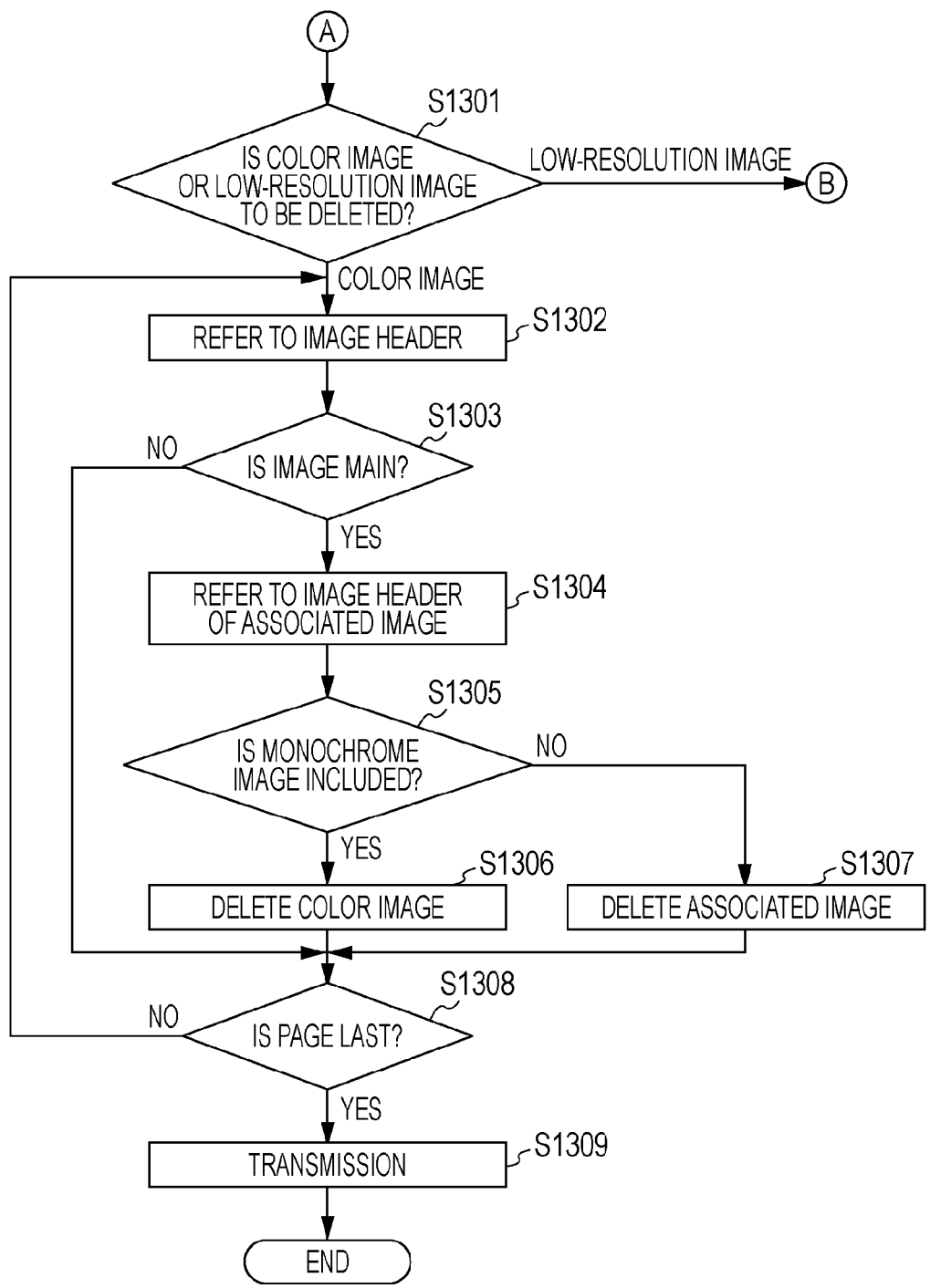
FIG. 13 is a continuation of FIG. 12.
Figure 14:
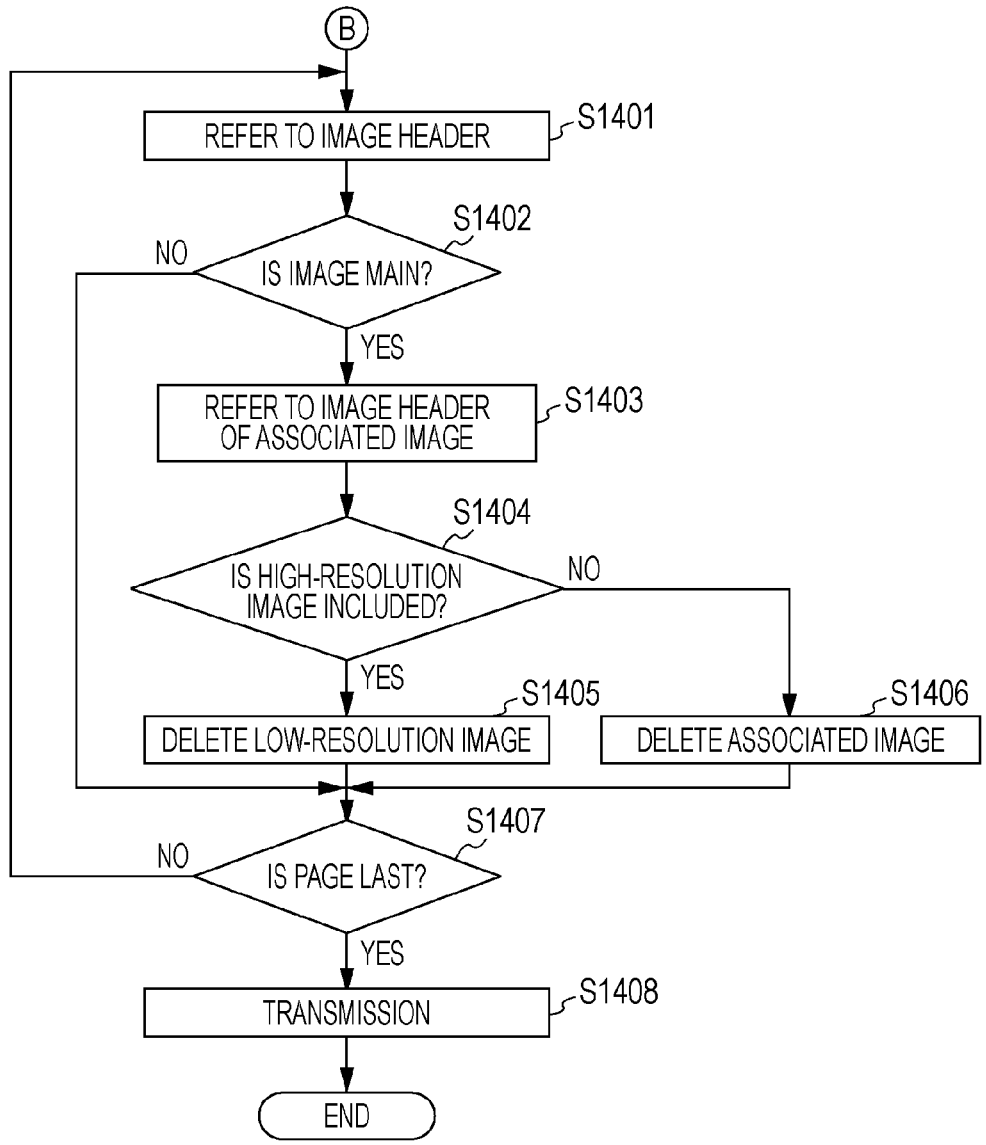
FIG. 14 is a continuation of FIG. 13.

FIGS. 12, 13, and 14 illustrate a flowchart explaining an operation of, when an instruction to transmit a file is accepted, selecting at least one image from among images associated with each other of images contained in the target file specified to be transmitted and outputting the selected image. The operation (process) illustrated by the flowchart in FIGS. 12, 13, and 14 is achieved by implementing a control program through the CPU 211 of the MFP 100.

When the TRANSMIT button 1005 is pressed in the file list window, a determination is made in step S1201 as to whether a target file specified to be transmitted is in the multiple-image format. This determination is made based on information stored in the file header 301 shown in FIG. 3. When it is determined that the target file is in the multiple-image format, the process proceeds to step S1202. If not, the process proceeds to step S1208.

In step S1202, setting information shown in FIG. 9 is read out from the HDD 214. In step S1203, a determination is made based on the value in the item 901 as to whether setting for output of the file in the multiple-image format has been made. If it is determined that output setting of the file in the multiple-image format has been made, the process proceeds to step S1204. If not, the process proceeds to step S1208.

As a result of determination in step S1201 or S1203, if the process proceeds to step S1208, the selected file is transmitted as it is to a specified transmission destination and the process is terminated.

In step S1204, a determination is made based on the value in the item 902 as to whether or not to output an image contained in the target file as a file in the multiple-image format when the instruction to output the file in the multiple-image format is given. If it is determined that an image in the file is to be output as a file in the multiple-image format, the process proceeds to step S1301. If not, the process proceeds to step S1205.

In step S1205, a determination is made as to whether or not to output a plurality of images contained in the target file as individual files when the instruction to output the file in the multiple-image format is given. If it is determined that the images contained in the target file are to be output as individual files, the process proceeds to step S1206. If not, the process proceeds to step S1207.

In step S1206, a file is generated for each of the images contained in the target file.

Figure 15:
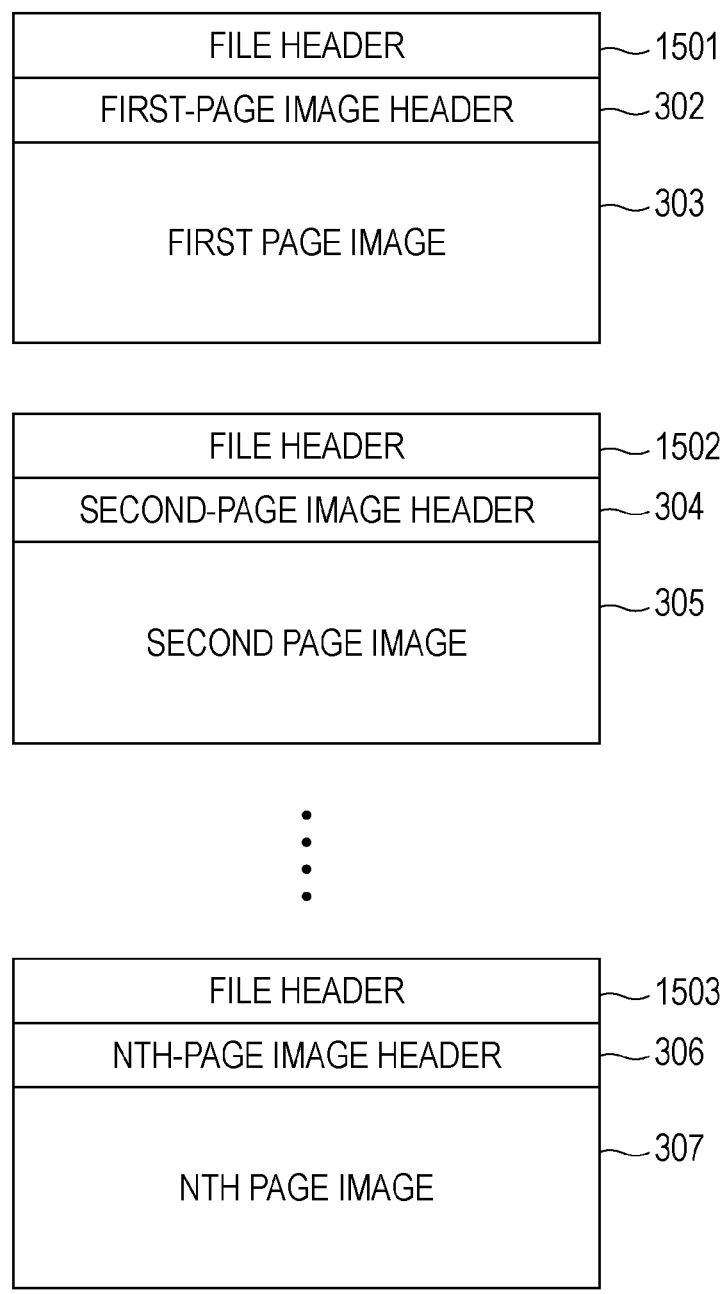
FIG. 15 is a diagram illustrating the structures of files converted in a non-multiple-image format in the embodiment of the present invention, the files being to be output.

FIG. 15 is a diagram illustrating the structures of respective files generated in step S1206 in FIG. 12. The files are generated by processing in step S1206 on the file in the multiple-image format shown in FIG. 3. In the case where it is determined in step S1205 that the images contained in the target file specified to be output are to be output as individual files, the images contained in the original file are stored into different files, as shown in FIG. 15.

Specifically, a file header 1501 is added to the first-page image header 302 and the first-page image 303 in the original file. A file header 1502 is added to the second-page image header 304 and the second page image 305 in the original file. Similarly, a file header 1503 is added to the Nth-page image header 306 and the Nth page image 307 in the original file.

In step S1206, the files equal in number to the images contained in the target file are generated in the above-described manner. In step S1208, the generated files are transmitted to the specified destination.

On the other hand, in step S1207, one image with the representative image flag 401 on is left in the images contained in the file specified to be output and the other images are deleted, and one file containing the left image is generated. In step S1208, the generated file is transmitted to the specified destination.

Referring to FIG. 13, in step S1301, a determination is made as to whether to select and output a monochrome image or a high-resolution image from among the images contained in the target file (namely, whether to delete a color image or a low-resolution image) when the instruction to output a file in the multiple-image format is given. If it is determined that a monochrome image is to be selected and output (namely, a color image is to be deleted), the process proceeds to step S1302. When it is determined that a high-resolution image is to be selected and output (namely, a low-resolution image is to be deleted), the process proceeds to step S1401.

In step S1302, the first-page image header contained in the target file is referred to. In step S1303, a determination is made based on the main image flag 402 in the image header as to whether the first page image is a main image. If it is determined that the first page image is a main image, the process proceeds to step S1304. If not, the process proceeds step S1308.

In step S1304, the image header of another image associated with the first page image is referred to on the basis of information included in the associated-image information 403. In step S1305, a determination is made as to whether a monochrome image is included in the images including the first page image (main image) and the other image (associated image) associated with the first page image. If a monochrome image is included in the images, the process proceeds to step S1306. If not, the process proceeds to step S1307.

In step S1306, a color image is deleted from the images including the first page image (main image) and the other image (associated image) associated with the first page image. On the other hand, in step S1307, the first page image (main image) is left and the other image (associated image) associated with the first page image is deleted.

In step S1308, a determination is made as to whether the image header referred to in step S1302 belongs to the last page. If it is determined that the image header does not belong to the last page (namely, the next page exists), the process returns to step S1302. In step S1302, the image header of the next page is referred to.

If it is determined in step S1308 that the image header referred to in step S1302 belongs to the last page, the process proceeds step S1309. In step S1309, images which are not deleted in step S1306 or S1307 are transmitted in a single file in the multiple-image format to the destination.

Figure 16:
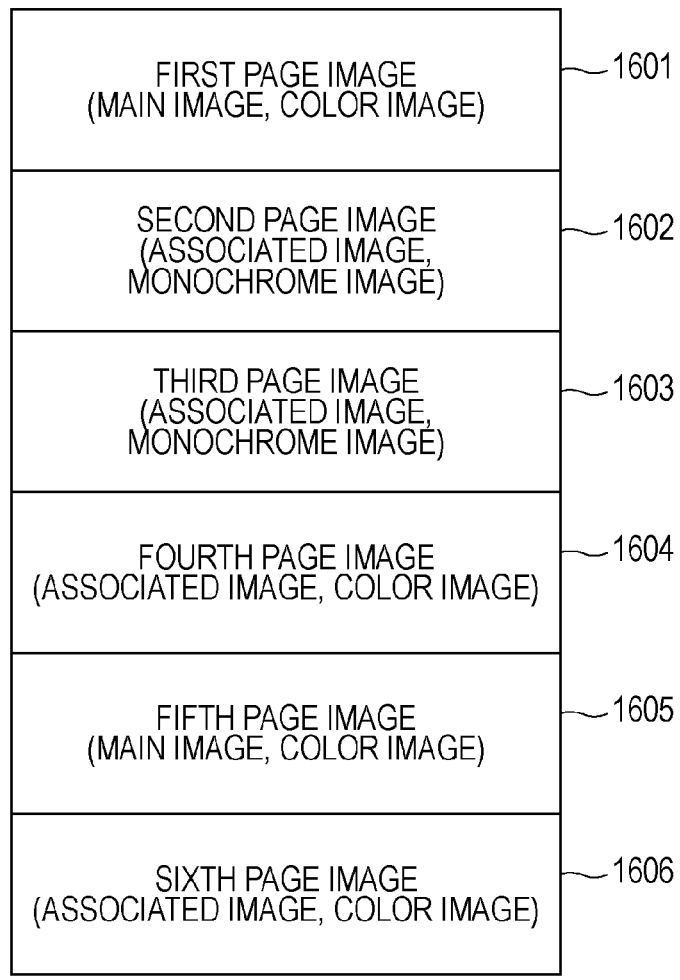
FIG. 16 is a diagram illustrating a file in the multiple-image format in the embodiment of the present invention.

Processing in steps S1302 to S1308 will be concretely described with reference to FIG. 16. FIG. 16 illustrates a multiple-image format file specified to be output.

Referring to FIG. 16, three images (1601, 1602, and 1603) are included in the first to third pages of the file, respectively. The image 1601 is a main image and the images 1601 to 1603 are associated with each other. In addition, other three images (1604, 1605, and 1606) are included in the fourth to sixth pages of the file, respectively. The image 1605 is a main image and the images 1604 to 1606 are associated with each other. The images 1601, 1604, 1605, and 1606 are color images and the images 1602 and 1603 are monochrome images.

The file is subjected to the processing in step S1302 to S1308 as follows. In step S1302, the image header of the image 1601 is referred to, so that the image 1601 is recognized as a main image. In step S1304, the respective image headers of the images 1602 and 1603 associated with the image 1601 are referred to.

In step S1305, it is determined that monochrome images are included in the images associated with each other, since the images 1602 and 1603 are monochrome images. The process proceeds to step S1306. In step S1306, the image 1601 that is color is deleted. In this case, since the image 1601 as a main image is deleted, the image 1602 associated with and next to the image 1601 is specified as a new main image.

Subsequently, the process proceeds to step S1308 and then returns to step S1302. The image header of the image 1602 and that of the image 1603 are referred to. In this instance, the images 1602 and 1603 associated with the image 1601 have been subjected to the processing in steps S1302 to S1308. Accordingly, the images 1602 and 1603 are not deleted.

After that, the image header of the image 1604 is referred to. Since the image 1604 is not a main image, the process proceeds to step S1308.

The process then returns to step S1302. The image header of the image 1605 is referred to, so that the image 1605 is recognized as a main image. In step S1304, the image headers of the images 1604 and 1606 associated with the image 1605 are referred to.

In step S1305, since each of the images 1604, 1605, and 1606 is a color image, it is determined that a monochrome image is not included in the images associated with each other. The process proceeds to step S1307. In step S1307, the images 1604 and 1606, serving as associated images, are deleted. In this case, since there is no image associated with the remaining image 1605, the main image flag 402 in the image header of the image 1605 is automatically switched off.

Figure 17:
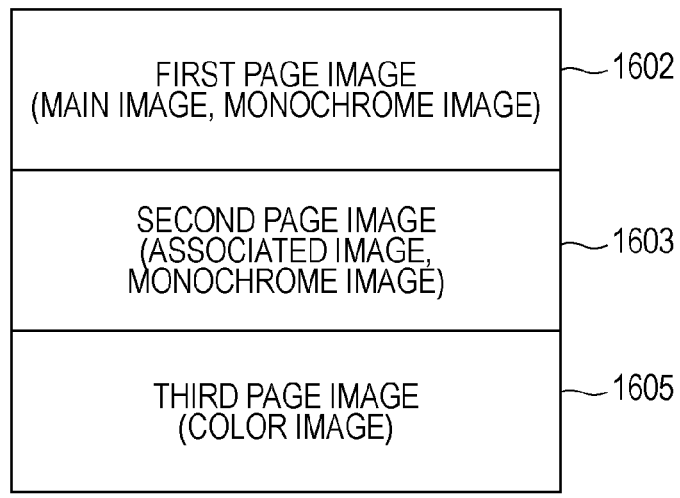
FIG. 17 is a diagram illustrating a file in the multiple-image format in the embodiment of the present invention.

As a result of the above-described processing, a multiple-image format file containing the images 1602, 1603, and 1605, namely, the three images shown in FIG. 17 is finally transmitted.

A case where it is determined in step S1301 that a high-resolution image is to be selected and output (namely, a low-resolution image is to be deleted) will now be described with reference to FIG. 14. In step S1401, the image header of the first page image contained in the target file specified to be output is referred to. In step S1402, a determination is made based on the main image flag 402 in the image header as to whether the first page image is a main image. If it is determined that the first page image is a main image, the process proceeds to step S1403. If not, the process proceeds to step S1407.

In step S1403, the image header of another image (associated image) associated with the first page image is referred to on the basis of information stored as the associated-image information 403. In step S1404, a determination is made as to whether a high-resolution image is included in the images including the first page image (main image) and the other image (associated image) associated with the first page image. In this determination, an image with a resolution lower than a set resolution in the item 905 is a low-resolution image and an image with a resolution equal to or higher than the set resolution is a high-resolution image. When it is determined that a high-resolution image is included, the process proceeds to step S1405. If not, the process proceeds to step S1406.

In step S1405, a low-resolution image is deleted from the images including the first page image (main image) and the other image (associated image) associated with the first page image. On the other hand, in step S1406, the first page image (main image) is left and the other image associated with the first page image is deleted.

In step S1407, a determination is made as to whether the image header referred to in step S1401 belongs to the last page. If it is determined that the image header does not belong to the last page (namely, the next page exists), the process returns to step S1401. In step S1401, the image header of the next page is referred to.

If it is determined that the image header referred to in step S1401 belongs to the last page, the process proceeds to step S1408. In step S1408, images which are not deleted in step S1405 or S1406 are transmitted in a single file in the multiple-image format to the destination.

Processing in steps S1401 to S1407 will now be concretely described with reference to FIG. 18. FIG. 18 illustrates a multiple-image format file specified to be output. Referring to FIG. 18, three images (1801, 1802, and 1803) are included in the first to third pages of the file, respectively. The image 1801 is a main image and the images 1801 to 1803 are associated with each other. In addition, other three images (1804, 1805, and 1806) are included in the fourth to sixth pages. The image 1805 is a main image and the images 1804 to 1806 are associated with each other. The images 1801, 1804, 1805, and 1806 are low-resolution images and the images 1802 and 1803 are high-resolution images.

The file is subjected to the processing in steps S1401 to 1407 as follows. In step S1401, the image header of the image 1801 is referred to, so that the image 1801 is recognized as a main image. In step S1403, the image headers of the images 1802 and 1803 associated with the image 1801 are referred to.

In step S1404, it is determined that high-resolution images are included in the images associated with each other, since the images 1802 and 1803 are high-resolution images. The process proceeds to step S1405. In step S1405, the image 1801, serving as a low-resolution image, is deleted. In this case, since the image 1801 as the main image is deleted, the image 1802 associated with and next to the image 1801 is specified as a new main image.

Subsequently, the process proceeds to step S1407 and then returns to step S1401. The image header of the image 1802 and that of the image 1803 are referred to. In this instance, the images 1802 and 1803 associated with the image 1801 have been subjected to the processing in steps S1401 to 1407. Accordingly, the images 1802 and 1803 are not deleted.

After that, the image header of the image 1804 is referred to. Since the image 1804 is not a main image, the process proceeds to step S1407.

The process then returns to step S1401. The image header of the image 1805 is referred to, so that the image 1805 is recognized as a main image. In step S1403, the image headers of the images 1804 and 1806 associated with the image 1805 are referred to.

In step S1404, since each of the images 1804, 1805, and 1806 is a low-resolution image, it is determined that a high-resolution image is not included in the images associated with each other. The process proceeds to step S1406. In step S1406, the images 1804 and 1806, serving as associated images, are deleted. In this case, since there is no image associated with the remaining image 1805, the main image flag 402 in the image header of the image 1805 is automatically switched off.

As a result of the above-described processing, a multiple-image format file containing the images 1802, 1803, and 1805, namely, the three images shown in FIG. 19 is finally transmitted.

As described above, in the first embodiment, when an instruction to output a file containing a plurality of images, at least one image is selected from among images associated with each other of the images contained in the file in accordance with conditions set as user mode settings. Consequently, after an unnecessary image is deleted from the images contained in the file specified to be output, the images can be output. Advantageously, needless processing for output of an unnecessary image is avoided.

In addition, a terminal, serving as an image output destination, is supplied with the images from which images unnecessary for the terminal have been removed (deleted) in the output source. Advantageously, the terminal escapes receiving a file having a large amount of data.

Second Embodiment

A second embodiment of the present invention will be described below. The first embodiment has been described with respect to the case where conditions for selecting at least one image from among images associated with each other of images contained in a single file are set as user mode settings. In other words, in the first embodiment, images are selected in accordance with common conditions at all times unless the user intentionally changes the conditions when giving an instruction to output a file.

According to the second embodiment, a mechanism for setting the above-described conditions to select an image for each output destination previously registered in the HDD 214 is further provided. Since the structure in the second embodiment is the same as that in the first embodiment except for the mechanism, redundant description is omitted.

Figure 20:
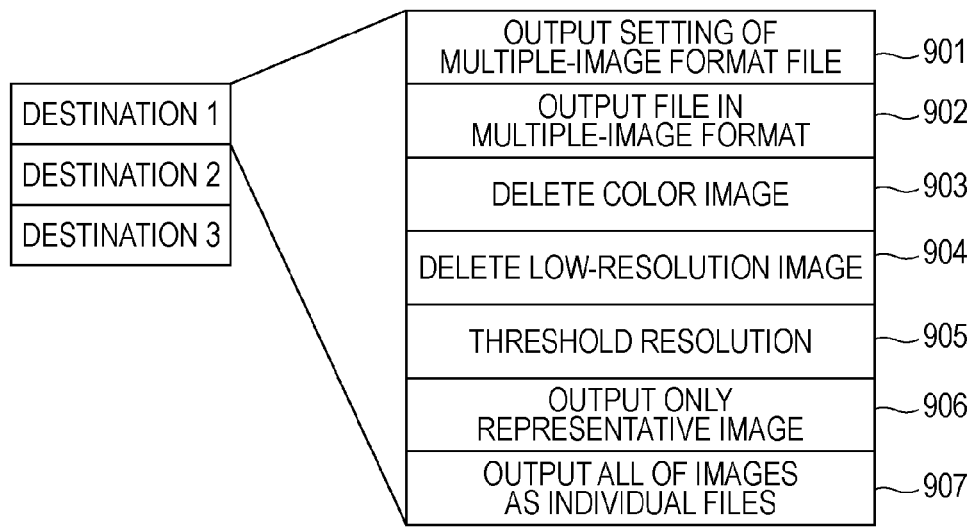
FIG. 20 is a diagram illustrating a management table for managing conditions set in association with each output destination previously registered in another embodiment of the present invention.

FIG. 20 illustrates a management table for managing descriptions of settings in a case where conditions for selecting at least one image from among images associated with each other of images contained in a single file are set in association with each output destination previously registered.

As shown in FIG. 20, values are set in the items 901 to 907 described with reference to FIG. 9 for each of "DESTINATION 1", "DESTINATION 2", and "DESTINATION 3" and the values are managed.

In the second embodiment, the process illustrated by the flowchart shown in FIGS. 12, 13, and 14 is performed in a manner similar to the above-described first embodiment, thus outputting a selected image. Only processing in step S1202 in FIG. 12 is different from that in the first embodiment. Specifically, in step S1202 in the second embodiment, conditions for a specified destination is read out in accordance with the destination specified by the user in the destination specification window.

For example, so long as an administrator sets conditions to select an image for each output destination in accordance with the capacity of the output destination, therefore, if the user who actually gives an instruction to output a file does not know the capacity of an output destination, a necessary image can be appropriately selected and be output. Specifically, conditions to delete a color image and output an image can be set for an output destination that does not support color images and processes only monochrome images. Conditions to output an image without deleting a color image can be set for an output destination that supports color images.

To set conditions in association with an output destination, the conditions may be set on the windows shown in FIGS. 5 to 8. Alternatively, the MFP 100 may directly communicate with each output destination to exchange their capacity information so that the conditions can be automatically set.

If a specified output destination is not registered in the HDD 214, alternatively, when a specified output is registered in the HDD 214 but conditions are not set, common conditions set as user mode settings described in the first embodiment may be used.

Third Embodiment

A third embodiment of the present invention will be described below. The first embodiment has been described with respect to the case where conditions to select at least one image from among images associated with each other of images contained in a single file are set as user mode settings. Specifically, in the first embodiment, an image is selected in accordance with the common conditions unless the user intentionally changes the conditions when giving an instruction to output a file.

According to the third embodiment, a mechanism for setting the above-described conditions to select an image in association with each of different methods available for image output is further provided. Since the structure in the third embodiment is the same as that in the first embodiment except for the mechanism, redundant description is omitted.

Figure 21:
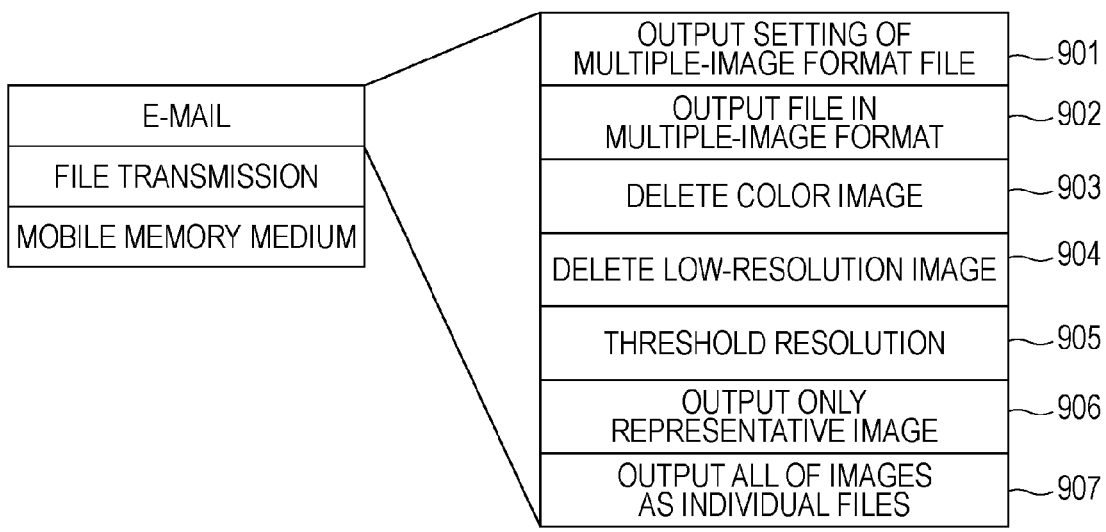
FIG. 21 is a diagram illustrating a management table for managing conditions set in association with each method of outputting in another embodiment of the present invention.

FIG. 21 illustrates a management table for managing descriptions of settings in a case where conditions to select at least one image from among images associated with each other of images contained in a single file are set in association with each method of outputting.

The MFP 100 outputs an image by means of any of different methods of outputting, e.g., e-mail transmission via the e-mail server 130, file transmission using SMB to the PC 110 or the file server 120, and output to the mobile memory medium 221. In the third embodiment, conditions to select an image are set for each method of outputting, as shown in FIG. 21.

In the third embodiment, although the process illustrated by the flowchart shown in FIGS. 12, 13, and 14 is performed in the same way as the first embodiment and a selected image is output, only processing in step S1202 in the third embodiment differs from that in the first embodiment. Specifically, in step S1202 in the third embodiment, conditions for a specified destination are read out in accordance with a method of outputting used for outputting an image to the destination specified by the user in the destination specification window.

Consequently, for example, when an image is intended to be attached to an e-mail, a condition for deleting many images can be set so that the amount of data to be output is lower than that for file transmission or that for output to the mobile memory medium.

The first to third embodiments have been described. Features of the above-described first to third embodiments may be individually provided, or may be appropriately combined.

In the above description, the window shown in FIG. 7 prompts the user to select either of the condition "DELETE COLOR IMAGE" and the condition "DELETE LOW-RESOLUTION IMAGE". Other conditions to be selected may be provided. For example, a condition "DELETE MONOCHROME IMAGE WITH RESOLUTION OF MORE THAN 400 dpi" can be provided.

In the above description, images associated with each other are defined as images having the same contents and different visuals, e.g., color and monochrome or different resolutions. For example, a plurality of images successively captured at predetermined short intervals may be handled as images associated with each other.

Other Embodiments

The embodiments of the present invention have been described in detail above. The present invention can also take the form of an embodiment as, for example, a system, an apparatus, a method, a program, or a storage medium (recording medium). Specifically, the present invention is applicable to a system including a plurality of devices or an apparatus including a single device.

The present invention can also be achieved by supplying a program (in the embodiments, a program corresponding to the flowchart shown in the drawings) of software for implementing the functions of the above-described embodiments to a system or apparatus directly or from a remote external device, and allowing a computer of the system or apparatus to read out and execute the supplied program code.

Accordingly, the program code itself installed in the computer to implement functional processing of the present invention by the computer may also implement aspects of the present invention. In other words, aspects of the present invention may include the computer program itself for implementing the functional processing of the present invention.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

The invention claimed is:

1. An image processing apparatus comprising:
an accepting unit configured to accept an output instruction to output a single file containing a plurality of images from a user;
an outputting unit configured to output at least one of the plurality of images contained in the file specified to be output based on the output instruction;
a selecting unit configured to specify images which are associated with each other from among the plurality of images contained in the file specified to be output, and to select at least one image from among the specified images;

a setting unit configured to set a condition for image selection by the selecting unit, wherein the selecting unit selects at least one image that meets the condition set by the setting unit from among the specified images associated with each other, wherein the specified images associated with each other are a color image and a monochrome image which have same contents, wherein the setting unit is capable of setting a first condition for selecting a monochrome image from among the specified images associated with each other, and, when the first condition is set by the setting unit, the selecting unit selects a monochrome image from among the specified images associated with each other; and a controlling unit configured to cause the outputting unit to output the image, selected by the selecting unit, in accordance with the acceptance of the output instruction by the accepting unit.

2. The apparatus according to claim 1, wherein the outputting unit outputs a single file, wherein the single file contains the image selected by the selecting unit and does not include other images not selected by the selecting unit.

3. The apparatus according to claim 1, further comprising:
a first specifying unit configured to specify, when the accepting unit accepts the output instruction, whether to perform control for causing the outputting unit to output the image, selected by the selecting unit, of the plurality of images contained in the file specified to be output.

4. A method of controlling an image processing apparatus, the method comprising:
accepting an output instruction to output a single file containing a plurality of images from a user;
outputting at least one of the plurality of images contained in the file specified to be output based on the output instruction;
specifying images which are associated with each other from among the plurality of images contained in the file specified to be output, and selecting at least one image from among the specified images;
setting a condition for image selection by the selecting, wherein selecting includes selecting at least one image that meets the set condition from among the specified images associated with each other,
wherein the specified images associated with each other are a color image and a monochrome image which have same contents, wherein the setting is capable of setting a first condition for selecting a monochrome image from among the specified images associated with each other, and, when the first condition is set, selecting includes selecting a monochrome image from among the specified images associated with each other; and
causing output of the selected image in accordance with the acceptance of the output instruction.

5. A non-transitory computer-readable storage medium that stores a program for allowing a computer to execute the method according to claim 4.

6. An image processing apparatus comprising:
an accepting unit configured to accept an output instruction to output a single file containing a plurality of images from a user;
an outputting unit configured to output at least one of the plurality of images contained in the file specified to be output based on the output instruction;
a selecting unit configured to specify images which are associated with each other from among the plurality of images contained in the file specified to be output, and to select at least one image from among the specified images;
a setting unit configured to set a condition for image selection by the selecting unit, wherein the selecting unit selects at least one image that meets the condition set by the setting unit from among the specified images associated with each other,
wherein the specified images associated with each other are images having same contents and different resolutions, wherein the setting unit is capable of setting a second condition for selecting an image with a resolution higher than a predetermined resolution from among the specified images associated with each other, and, when the second condition is set by the setting unit, the selecting unit selects an image with a resolution higher than the predetermined resolution from among the specified images associated with each other; and
a controlling unit configured to cause the outputting unit to output the image, selected by the selecting unit, in accordance with the acceptance of the output instruction by the accepting unit.

7. A method of controlling an image processing apparatus, the method comprising:
accepting an output instruction to output a single file containing a plurality of images from a user;
outputting at least one of the plurality of images contained in the file specified to be output based on the output instruction;
specifying images which are associated with each other from among the plurality of images contained in the file specified to be output, and selecting at least one image from among the specified images;
setting a condition for image selection by the selecting, wherein selecting includes selecting at least one image that meets the set condition from among the specified images associated with each other,
wherein the specified images associated with each other are images having same contents and different resolutions, wherein the setting is capable of setting a second condition for selecting an image with a resolution higher than a predetermined resolution from among the specified images associated with each other, and, when the second condition is set, selecting includes selecting an image with a resolution higher than the predetermined resolution from among the specified images associated with each other; and
causing output of the selected image in accordance with the acceptance of the output instruction.

8. A non-transitory computer-readable storage medium that stores a program for allowing a computer to execute the method according to claim 7.

9. An image processing apparatus comprising:
an accepting unit configured to accept an output instruction to output a single file containing a plurality of images from a user;
an outputting unit configured to output at least one of the plurality of images contained in the file specified to be output based on the output instruction;
a selecting unit configured to specify images which are associated with each other from among the plurality of images contained in the file specified to be output, and to select at least one image from among the specified images;

a setting unit configured to set a condition for image selection by the selecting unit, wherein the selecting unit selects at least one image that meets the condition set by the setting unit from among the specified images associated with each other;

a registering unit configured to register an output destination to which an image is output by the outputting unit, wherein the setting unit is capable of setting a condition for image selection by the selecting unit for each output destination registered by the registering unit, and wherein the selecting unit selects an image in accordance with a condition for an output destination of the file specified to be output based on the output instruction; and a controlling unit configured to cause the outputting unit to output the image, selected by the selecting unit, in accordance with the acceptance of the output instruction by the accepting unit.

10. A method of controlling an image processing apparatus, the method comprising:

accepting an output instruction to output a single file containing a plurality of images from a user;

outputting at least one of the plurality of images contained in the file specified to be output based on the output instruction;

specifying images which are associated with each other from among the plurality of images contained in the file specified to be output, and selecting at least one image from among the specified images;

setting a condition for image selection by the selecting, wherein selecting includes selecting at least one image that meets the set condition from among the specified images associated with each other;

registering an output destination to which an image is output, wherein the setting is capable of setting a condition for image selection for each registered output destination, and wherein selecting includes selecting an image in accordance with a condition for an output destination of the file specified to be output based on the output instruction; and causing output of the selected image in accordance with the acceptance of the output instruction.

11. A non-transitory computer-readable storage medium that stores a program for allowing a computer to execute the method according to claim 10.

12. An image processing apparatus comprising:

an accepting unit configured to accept an output instruction to output a single file containing a plurality of images from a user;

an outputting unit configured to output at least one of the plurality of images contained in the file specified to be output based on the output instruction;

a selecting unit configured to specify images which are associated with each other from among the plurality of images contained in the file specified to be output, and to select at least one image from among the specified images;

a setting unit configured to set a condition for image selection by the selecting unit, wherein the selecting unit selects at least one image that meets the condition set by the setting unit from among the specified images associated with each other, wherein the setting unit is capable of setting a condition for image selection by the selecting unit in association with each method of outputting, and wherein the selecting unit selects an image in accordance with a condition associated with a method of outputting used for outputting the file specified to be output based on the output instruction; and a controlling unit configured to cause the outputting unit to output the image, selected by the selecting unit, in accordance with the acceptance of the output instruction by the accepting unit.

13. A method of controlling an image processing apparatus, the method comprising:

accepting an output instruction to output a single file containing a plurality of images from a user;

outputting at least one of the plurality of images contained in the file specified to be output based on the output instruction;

specifying images which are associated with each other from among the plurality of images contained in the file specified to be output, and selecting at least one image from among the specified images;

setting a condition for image selection by the selecting, wherein selecting includes selecting at least one image that meets the set condition from among the specified images associated with each other, wherein the setting is capable of setting a condition for image selection in association with each method of outputting, and wherein the selecting selects an image in accordance with a condition associated with a method of outputting used for outputting the file specified to be output based on the output instruction; and causing output of the selected image in accordance with the acceptance of the output instruction.

14. A non-transitory computer-readable storage medium that stores a program for allowing a computer to execute the method according to claim 13.

15. An image processing apparatus comprising:

an accepting unit configured to accept an output instruction to output a single file containing a plurality of images from a user;

an outputting unit configured to output at least one of the plurality of images contained in the file specified to be output based on the output instruction;

a selecting unit configured to specify images which are associated with each other from among the plurality of images contained in the file specified to be output, and to select at least one image from among the specified images;

a first specifying unit configured to specify, when the accepting unit accepts the output instruction, whether to cause the outputting unit to output, as a single file, the image selected by the selecting unit or to cause the outputting unit to output, as a single file, any one of the plurality of images contained in the file specified to be output; and a controlling unit configured to cause the outputting unit to output the image, selected by the selecting unit, in accordance with the acceptance of the output instruction by the accepting unit.

16. The apparatus according to claim 15, further comprising:

a second specifying unit configured to specify, when the first specifying unit specifies to cause the outputting unit to output, as a single file, any one of the plurality of images contained in the file specified to be output, whether to cause the outputting unit to output the plurality of images contained in the file specified to be output as individual files or to cause the outputting unit to output one image previously specified as a representative image of the plurality of images contained in the file specified to be output.

17. A method of controlling an image processing apparatus, the method comprising:
- accepting an output instruction to output a single file containing a plurality of images from a user;
- outputting at least one of the plurality of images contained in the file specified to be output based on the output instruction;
- specifying images which are associated with each other from among the plurality of images contained in the file specified to be output, and selecting at least one image from among the specified images;
- specifying, when accepting the output instruction, whether to cause outputting, as a single file, the selected image or to cause outputting, as a single file, any one of the plurality of images contained in the file specified to be output; and
- causing output of the selected image in accordance with the acceptance of the output instruction.

18. A non-transitory computer-readable storage medium that stores a program for allowing a computer to execute the method according to claim 17.

* * * * *